US009916811B2

(12) United States Patent
Matsui

(10) Patent No.: US 9,916,811 B2
(45) Date of Patent: Mar. 13, 2018

(54) COLOR CONVERSION DATA GENERATION DEVICE, COLOR CONVERSION DATA GENERATION METHOD, AND DISPLAY DEVICE

(71) Applicant: NEC DISPLAY SOLUTIONS, LTD., Tokyo (JP)

(72) Inventor: Katsuyuki Matsui, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 6 days.

(21) Appl. No.: 15/046,523

(22) Filed: Feb. 18, 2016

(65) Prior Publication Data

US 2016/0253981 A1 Sep. 1, 2016

(30) Foreign Application Priority Data

Feb. 26, 2015 (JP) .................................. 2015-036284

(51) Int. Cl.
*G09G 5/06* (2006.01)
*H04N 1/60* (2006.01)
(Continued)

(52) U.S. Cl.
CPC ................. *G09G 5/06* (2013.01); *H04N 1/60* (2013.01); *H04N 1/6027* (2013.01);
(Continued)

(58) Field of Classification Search
CPC ....... G09G 2340/06; G09G 2300/0452; G09G 2360/16; G09G 2320/0242;
(Continued)

(56) References Cited

U.S. PATENT DOCUMENTS 5,489,996 A * 2/1996 Oku .......................... H04N 1/60
358/518
8,223,410 B2 * 7/2012 Wakazono ............. H04N 9/735
345/419

(Continued)

FOREIGN PATENT DOCUMENTS

JP 2013-232746 A 11/2013

*Primary Examiner* — Dismery Mercedes
(74) *Attorney, Agent, or Firm* — McGinn IP Law Group, PLLC.

(57) ABSTRACT

A color conversion data generation device includes: an acquisition unit that acquires end point correction values for correcting a color of at least one end point of a RGB color space; an end point color correction value generation unit that corrects the color of the at least one end point using the acquired end point correction values, to generate end point color correction values; a normalization unit that normalizes an intermediate color in the RGB color space using a normalization coefficient; an interpolation unit that interpolates the normalized intermediate color using the generated end point color correction values by means of same interpolation characteristic as that of a 3D LUT circuit, to generate temporary correction values; and an inverse normalization unit that inverse-normalizes the generated temporary correction values using an inverse normalization coefficient defined according to the normalization coefficient, to generate correction values of the intermediate color.

16 Claims, 6 Drawing Sheets

(51) Int. Cl.
*H04N 19/132* (2014.01)
*H04N 19/124* (2014.01)
*H04N 19/587* (2014.01)

(52) U.S. Cl.
CPC ......... *H04N 19/124* (2014.11); *H04N 19/132* (2014.11); *G09G 2300/0452* (2013.01); *G09G 2320/0276* (2013.01); *G09G 2320/0285* (2013.01); *G09G 2320/0666* (2013.01); *G09G 2340/06* (2013.01); *H04N 19/587* (2014.11)

(58) Field of Classification Search
CPC ... G09G 2320/0271; G09G 2320/0276; G09G 2320/0646; G09G 2320/0673; G09G 5/06; G09G 3/3413; H04N 5/202; H04N 5/213; H04N 5/23254; H04N 2209/046; H04N 9/3182; H04N 1/6027; H04N 19/59; H04N 19/124; H04N 19/132; H04N 19/587; G06T 2207/10024; G06T 2207/20182; G06T 5/002; G06T 5/003
See application file for complete search history.

(56) References Cited

U.S. PATENT DOCUMENTS

| | | | | |
|---|---|---|---|---|
| 8,619,165 B2* | 12/2013 | Kuniba | ................... | H04N 5/365 |
| | | | | 348/251 |
| 8,872,861 B2* | 10/2014 | Botzas | ................ | G09G 3/3413 |
| | | | | 345/102 |
| 8,872,981 B1* | 10/2014 | Gish | ...................... | H04N 19/46 |
| | | | | 345/590 |
| 9,049,410 B2* | 6/2015 | Botzas | ................... | H04N 5/202 |
| 9,142,187 B2* | 9/2015 | Kawaguchi | ............... | H04N 1/60 |
| 9,202,435 B2* | 12/2015 | Fujimura | .................. | G09G 5/06 |
| 9,520,104 B2* | 12/2016 | Nakamura | ................ | G09G 5/06 |
| 2007/0247647 A1* | 10/2007 | Pettigrew | ............. | G06T 11/001 |
| | | | | 358/1.9 |
| 2011/0157212 A1* | 6/2011 | Zhang | ...................... | H04N 9/67 |
| | | | | 345/590 |
| 2015/0248747 A1* | 9/2015 | Atkins | ...................... | G06T 5/10 |
| | | | | 345/589 |
| 2016/0044210 A1* | 2/2016 | Imafuku | .............. | H04N 1/6019 |
| | | | | 382/164 |

* cited by examiner

COLOR CONVERSION DATA GENERATION DEVICE, COLOR CONVERSION DATA GENERATION METHOD, AND DISPLAY DEVICE

This application is based upon and claims the benefit of priority from Japanese patent application No. 2015-036284, filed on Feb. 26, 2015, the disclosure of which is incorporated herein in its entirety by reference.

BACKGROUND OF THE INVENTION

Field of the Invention

The present invention relates to a color conversion data generation device, a color conversion data generation method, and a display device.

Description of Related Art

Various displays are used in professional work flows of video production and DTP (desktop publishing), and the same color reproduction is required between those different display products. In order to realize in a simplified manner, color management for performing the same color reproduction, there is a demand for realization of the same color reproduction by defining desired color reproduction as image quality parameters and batch-setting them on each display (performing LUT (look up table) import).

In relation to realization of this type of color reproduction, there has been disclosed a technique for performing 6-axis adjustment with use of LUT (for example, refer to Japanese Unexamined Patent Application, First Publication No. 2013-232746).

However, as regards hue, value, and saturation among the parameters that are adjusted by means of 6-axis adjustment, there is a problem in that no common correction characteristic has been established between display products, and as a result, the same color reproduction cannot be obtained even if the same parameters are set on products of different manufactures.

On the other hand, the same color reproduction can be obtained between a number of display products if 6-axis adjustment is performed by means of a generic 3D LUT (three-dimensional lookup table) circuit. However, there is a problem in that image quality is more likely to deteriorate. The cause of image deterioration is inconsistency between the tone characteristic required in a general 6-axis correction algorithm, and the tone characteristic in a 3D LUT circuit. Specifically, a general 6-axis correction algorithm requests a 3D LUT circuit for analog continuous tone characteristic. However, since the tone characteristic in the 3D LUT circuit is a linear tone characteristic that connects only a few LUT correction points, it does not match with the requested characteristic.

As a result, in a case where the conventional 6-axis color correction algorithm is set on the 3D LUT circuit, image quality deterioration such as unnatural hue shift, tone jump, and color rolling occurs in gradations of intermediate colors. Since this type of image quality deterioration occurs only when the 6-axis correction algorithm uses the 3D LUT circuit, it cannot be verified with the 6-axis correction algorithm alone. Therefore, conventionally it has been difficult to avoid it.

SUMMARY OF THE INVENTION

A color conversion data generation device according to an exemplary aspect of the present invention is for generating correction values to be set on a three-dimensional lookup table (3D LUT) circuit. The device includes: an acquisition unit that acquires end point correction values for correcting a color of at least one end point of a red, green, blue (RGB) color space; an end point color correction value generation unit that corrects the color of the at least one end point using the acquired end point correction values, to generate end point color correction values; a normalization unit that normalizes an intermediate color in the RGB color space using a normalization coefficient, the normalization coefficient being defined according to the intermediate color; an interpolation unit that interpolates the normalized intermediate color using the generated end point color correction values by means of same interpolation characteristic as that of the 3D LUT circuit, to generate temporary correction values; and an inverse normalization unit that inverse-normalizes the generated temporary correction values using an inverse normalization coefficient, to generate correction values of the intermediate color, the inverse normalization coefficient being defined according to the normalization coefficient.

A display device according to an exemplary aspect of the present invention includes: the color conversion data generation device described above; a conversion unit that converts a video signal using the 3D LUT circuit in which the end point color correction values and the correction values of the intermediate color are set; and a display unit that displays a video image indicated by the converted video signal.

A color conversion data generation method according to an exemplary aspect of the present invention is for generating correction values to be set on a three-dimensional lookup table (3D LUT) circuit. The method includes: acquiring end point correction values for correcting a color of at least one end point of a red, green, blue (RGB) color space; correcting the color of the at least one end point using the acquired end point correction values, to generate end point color correction values; normalizing an intermediate color in the RGB color space using a normalization coefficient, the normalization coefficient being defined according to the intermediate color; interpolating the normalized intermediate color using the generated end point color correction values by means of same interpolation characteristic as that of the 3D LUT circuit, to generate temporary correction values; and inverse-normalizing the generated temporary correction values using an inverse normalization coefficient, to generate correction values of the intermediate color, the inverse normalization coefficient being defined according to the normalization coefficient.

As described above, according to the present invention, it is possible to provide a color conversion data generation device, a color conversion data generation method, and a display device that generate correction values that enable suppression of image quality deterioration.

EXEMPLARY EMBODIMENT

Hereunder, a display system according to an exemplary embodiment of the present invention is described, with reference to the drawings.

Figure 1:
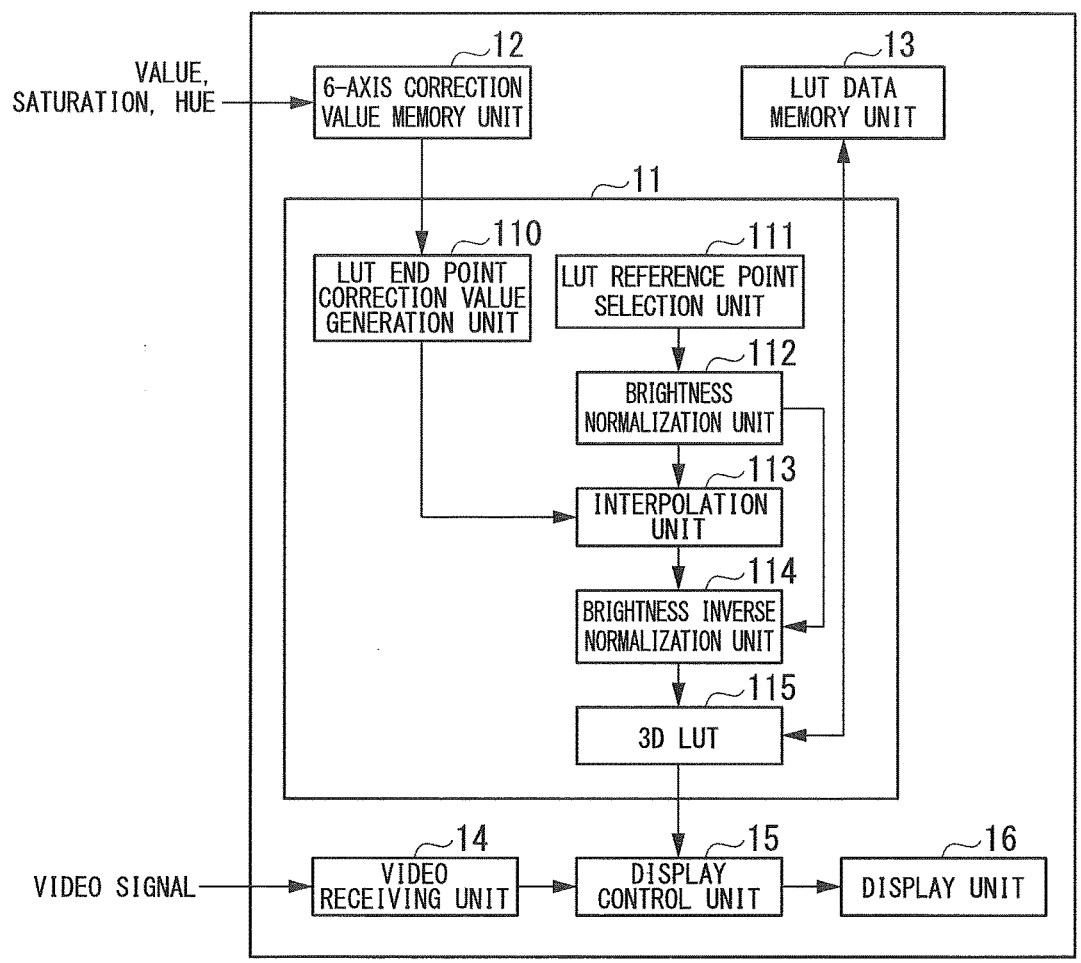
FIG. 1 is a diagram showing a schematic configuration of a display device including a generation device according to an exemplary embodiment of the present invention.

FIG. 1 is a diagram showing a schematic configuration of a display device 10 including a generation device 11 according to an exemplary embodiment of the present invention.

In FIG. 1, the display device 10 has a generation device 11, a 6-axis correction value memory unit 12, an LUT data memory unit 13, a video receiving unit 14, a display control unit 15, and a display unit 16. Among them, the 6-axis correction value memory unit 12 acquires user-input end point correction values for correcting the color of at least one end point of an RGB color space, and stores these correction values. In the present exemplary embodiment, correction values for correcting an end point color are acquired in a form of 6-axis correction values as an example. In the present exemplary embodiment, these 6-axis correction values are HSV values including three components, namely, hue, saturation, and value. The LUT data memory unit 13 stores 3D LUT generated by the generation device 11.

The generation device 11 is a color conversion data generation device that generates correction values to be set on a 3D LUT circuit, that are corrected by an input of 6-axis correction values (h, s, v) made by the user. This generation device 11 is described in detail later. The video receiving unit 14 receives input of a video signal, and outputs the received video signal to the display control unit 15. The display control unit 15 converts the video signal in the 3D LUT circuit where the correction values generated by the generation device 11 are set, and outputs it to the display unit 16. The display unit 16 displays a video image indicated by the video signal output from the display control unit 15. The display unit 16 may be, for example, an LCD (liquid crystal display). The display element equipped in the display unit 16 may be a display element other than a liquid crystal type display element, and examples of this include an organic electroluminescence display element, an inorganic electroluminescence display element, a PALC (plasma address liquid crystal), a PDP (plasma display panel), and an FED (field emission display).

Next, the generation device 11 is described in detail. The generation device 11 includes an LUT end point correction value generation unit (LUT end point color correction value generation unit) 110, an LUT reference point selection unit 111, a brightness normalization unit 112, an interpolation unit 113, a brightness inverse normalization unit 114, and a 3D LUT (circuit) 115. The correction values generated by the generation device 11 are stored in the LUT data memory unit 13 and set in the 3D LUT 115, and they are used for video signal conversion performed by the display control unit 15.

The generation device 11 in the present exemplary embodiment finds correction values of an intermediate color between end points in an RGB color space by using the same interpolation characteristic as that of the 3D LUT 115. The interpolation characteristic of the 3D LUT 115 in the present exemplary embodiment is linear interpolation, and accordingly, in the exemplary embodiment below, description is made where correction values are found when the interpolation characteristic of the 3D LUT 115 is linear interpolation.

Figure 2:
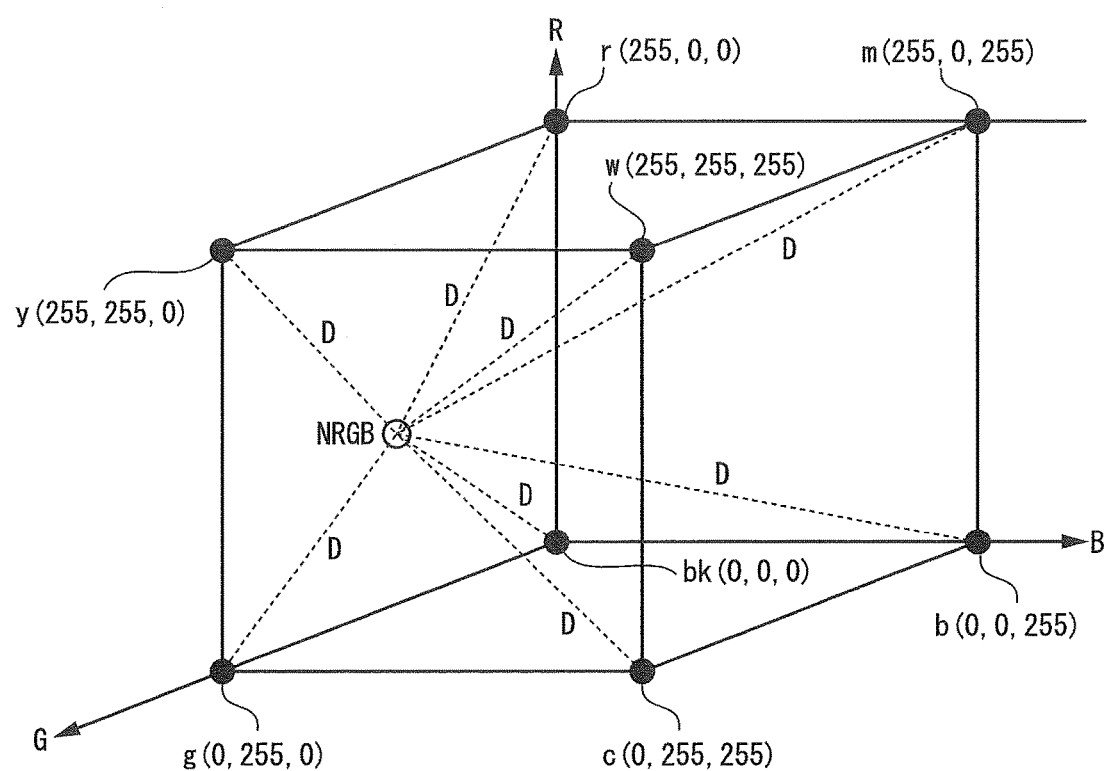
FIG. 2 is a diagram showing end points of an RGB color space in the exemplary embodiment.

The LUT end point correction value generation unit 110 generates correction values in which the color of an end point in the RGB color space is corrected with the 6-axis correction values (h, s, v) of user's input stored in the 6-axis correction value memory unit 12. FIG. 2 is a diagram showing end points of an RGB color space (3D LUT). There are eight end points in the RGB color space. Specifically, as shown in FIG. 2, these end points are (0, 0, 0), (255, 0, 0), (0, 255, 0), (0, 0, 255), (255, 255, 0), (0, 255, 255), (255, 0, 255), and (255, 255, 255). A correction value for at least one end point among these end points is input by the user.

Here, the end points are defined respectively as bk=(0, 0, 0), r=(255, 0, 0), g=(0, 255, 0), b=(0, 0, 255), y=(255, 255, 0), c=(0, 255, 255), m=(255, 0, 255), and w=(255, 255, 255).

The LUT end point correction value generation unit 110 first converts these end points into HSV values. Taking the end points bk, r, g, b, y, m, and w that have been converted into HSV values, respectively as bkhsv, rhsv, ghsv, bhsv, yhsv, mhsv, and whsv, then bkhsv=(0, 0, 0), rhsv=(0, 100, 100), ghsv=(120, 100, 100), bhsv=(240, 100, 100), yhsv=(60, 100, 100), mhsv=(300, 100, 100), and whsv=(0, 0, 100).

Then the LUT end point correction value generation unit 110 corrects the converted HSV values by means of the 6-axis correction values (h, s, v) of user's input stored in the 6-axis correction value memory unit 12. For example, where the HSV values of an end point are (α, β, γ), correction values become (α+h, β+s, γ+v). For example, if the 6-axis correction values (h, s, v) set by the user are (0, −10, −20), then yhsv=(60, 100, 100) will be corrected to (60, 90, 80). Correction will not be performed if corrected values become values that do not exist in HSV values. For example, if bk=(0, 0, 0) is corrected, this gives (0, −10, −20). Therefore, in this case, correction will not be performed.

The LUT end point correction value generation unit 110 generates RGB correction values at the end points by converting the correction values (α+h, β+s, γ+v) obtained in this manner into RGB. The correction values of the respective end points (end point color correction values) bk, r, g, b, y, m, and w are defined respectively as bk_c, r_c, g_c, b_c, y_c, m_c, and w_c.

Figure 3:
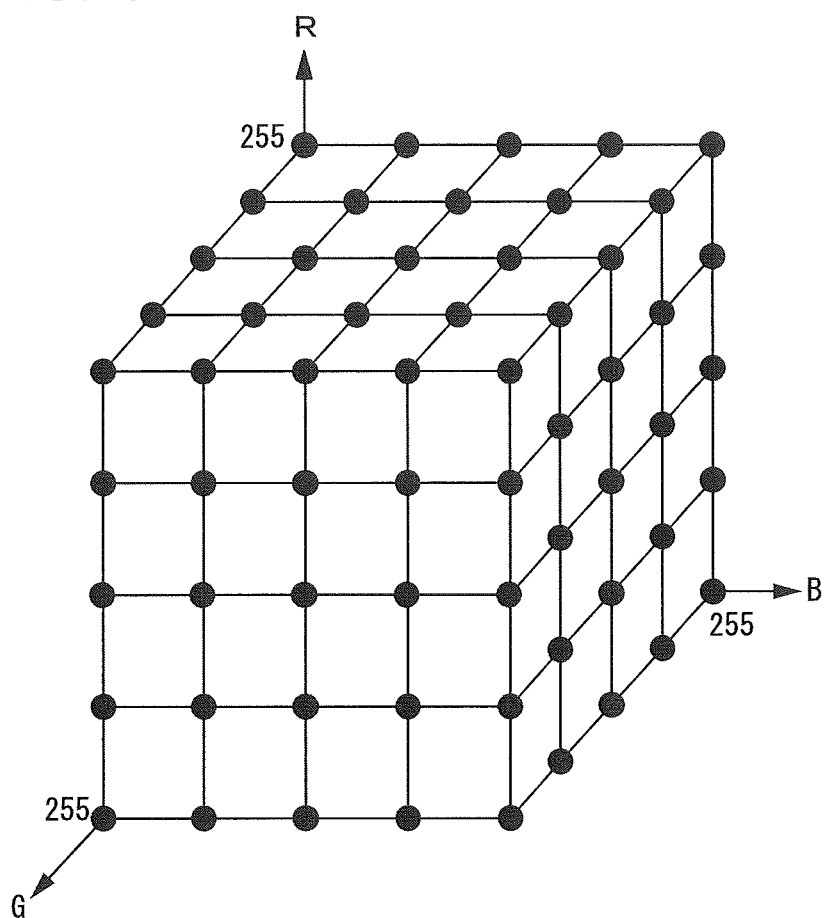
FIG. 3 is a diagram showing a color conversion LUT in the exemplary embodiment.

Once the end points have been corrected, then the correction values for each lattice point of an intermediate color of the 3D LUT are found. The LUT reference point selection unit 111 selects one lattice point (R, G, B) from lattice points shown in FIG. 3. In FIG. 3, for the sake of simplicity, ranges 0 through 255 denote lattice points composed of five tones. In the present exemplary embodiment, the LUT reference point selection unit 111 selects one lattice point (R, G, B), which is an intermediate color, from R=0, 32, 64, 96, 128, 160, 192, 224, or 255, G=0, 32, 64, 96, 128, 160, 192, 224, or 255, and B=0, 32, 64, 96, 128, 160, 192, 224, or 255.

Nine values are present for each of RGB, and therefore, the total number of lattice points (R, G, B) is 729.

The brightness normalization unit 112 normalizes the intermediate color selected by the LUT reference point selection unit 111, using a normalization coefficient, which is defined according to this intermediate color. Specifically, the brightness normalization unit 112 performs normalization so that the maximum value of the elements of the (R, G, B) becomes white ("255" in the present exemplary embodiment). For example, in the case where the (R, G, B) selected by the LUT reference point selection unit 111 are (128, 128, 0), the maximum value of the elements is "128". Therefore, in order to make the value white, the brightness normalization unit 112 approximately doubles each element to thereby normalize (128, 128, 0) to (255, 255, 0). The multiple at this time is expressed as a normalization coefficient.

Normalization target tones are the seven tones 32 to 224 (32, 64, 96, 128, 160, 192, 224) other than 0 and 255. Therefore a normalization coefficient m is preliminarily defined for each tone. Since there are seven tones, the number of normalization coefficients m is seven. Also, there are preliminarily defined values that are yielded when each of the tones 32 to 224 are multiplied by the normalization coefficient m. For example, although simply multiplying 128 by 2 would yield 256, it is preliminarily defined as 255. Hereunder, normalized (R, G, B) may be expressed as "NRGB" in some cases. This NRGB, since at least one element thereof is 255, is present on any one of planes R=255, G=255, and B=255. In this manner, the brightness normalization unit 112 normalizes the intermediate color by uniformly multiplying each tone value of R, G, and B showing the intermediate color, by the normalization coefficient. The normalization coefficient is a coefficient that makes the maximum tone value among the respective tone values of R, G, and B showing the intermediate color, into the maximum value (255) of the tone of R (red), G (green) or B (blue) when the maximum tone value is multiplied by the coefficient.

The interpolation unit 113 generates temporary correction values in which the NRGB, which is an intermediate color normalized by the brightness normalization unit 112, has been interpolated by the same interpolation characteristic as that of the 3D LUT 115, using the correction value generated by the LUT end point correction value generation unit 110.

Specifically, the interpolation unit 113 first finds a distance D to each end point from the reference point, as shown in FIG. 2. There are eight end points, and therefore, eight distances D are to be found.

Next, the interpolation unit 113 finds an addition coefficient k ($0 \le k \le 1$) that is defined for each end point, according to the distance D between the normalized intermediate color and each end point. This addition coefficient k takes a smaller value as the distance D becomes greater. When the distance D is a maximum, k=0. When the distance D is a minimum, k=1. Addition coefficients k corresponding to end points bk, r, g, b, y, m, and w are defined respectively as bk_k, r_k, g_k, b_k, y_k, m_k, and w_k.

Having defined the addition coefficients k in this manner, the interpolation unit 113 finds temporary correction values TC in the manner described below, since the interpolation characteristic of the 3D LUT 115 is linear interpolation.

$$TC = bk\_k \times bk\_c + r\_k \times r\_c + g\_k \times g\_c + b\_k \times b\_c + y\_k \times y\_c + m\_k \times m\_c + w\_k \times w\_c$$

In this manner, the interpolation unit 113 multiplies the correction value generated by the LUT end point correction value generation unit 110 by the addition coefficient k defined for each end point, and thereby interpolates the normalized intermediate color to generate temporary correction values TC.

The interpolation unit 113 that has generated temporary correction values TC outputs the temporary correction values TC to the brightness inverse normalization unit 114. The brightness inverse normalization unit 114 multiplies the temporary correction values TC by 1/m (inverse normalization coefficient), which is the inverse of the normalization coefficient m used at the time of normalizing in the brightness normalization unit 112, to thereby find the correction value of the reference point. That is to say, when TC=(a, b, c), The brightness inverse normalization unit 114 finds (a/m, b/m, c/m).

As a result, (a/m, b/m, c/m) is found as the correction value of the reference point (R, G, B) selected by the LUT reference point selection unit 111. The LUT reference point selection unit 111 selects all reference points excluding end points, and thereby the correction values of all lattice points are found. As a result, there is generated a corrected 3D LUT. In this manner, the brightness inverse normalization unit 114 inverse-normalizes the temporary correction values generated by the interpolation unit 113 by uniformly multiplying them by the inverse normalization coefficient, and thereby generates correction values in which the intermediate color has been corrected.

The correction values that have been fined by correcting the colors of the respective end points, which have been generated by the LUT end point correction value generation unit 110, and the correction values that have been fined by correcting the intermediate colors, which have been generated by the brightness inverse normalization unit 114, described above are stored in the LUT data memory unit 13 and are set in the 3D LUT 15.

Figure 4:
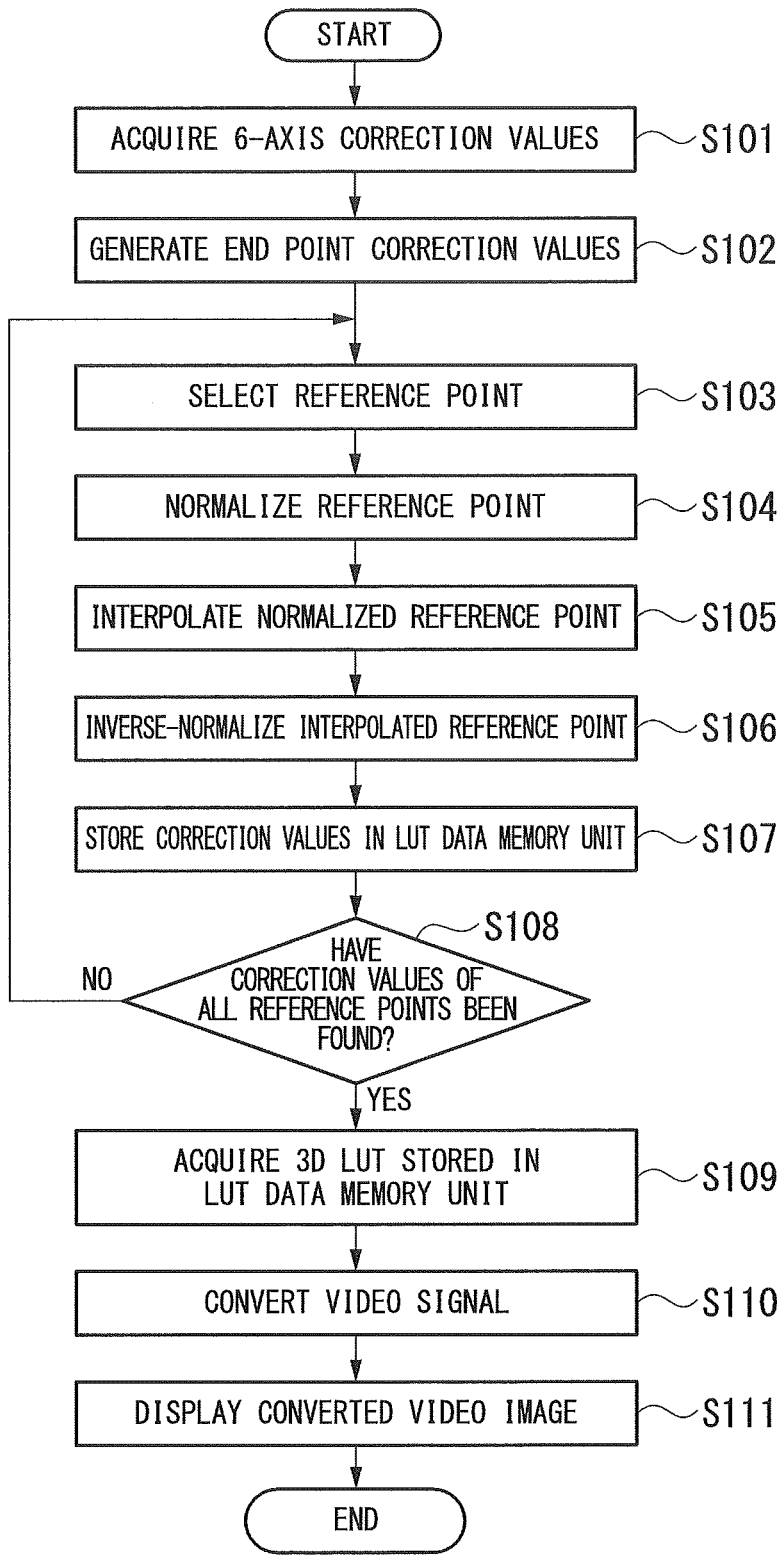
FIG. 4 is a flowchart showing processing steps of a generation step for generating a 3D LUT.

The method described above for finding correction values from reference points is described, with reference to a flowchart and a specific example. FIG. 4 is a flowchart showing processing steps of a generation step for generating a 3D LUT.

First, 6-axis correction values set by the user are acquired, and they are stored in the 6-axis correction value memory unit 12 (step S101). Here, it is supposed that as correction amounts (h, s, v) with respect to each end point color of RGBCMY, that is, red, green, blue, cyan, magenta, and yellow, 6-axis correction values (0, −10, −20) are acquired.

Next, the LUT end point correction value generation unit 110 generates correction values of an end point (step S102). As an example, here is described a method for generating correction values of an end pointy (255, 255, 0). First, converting (255, 255, 0) into HSV values yields yhsv=(60, 100, 100). Then since the 6-axis correction values (h, s, v) are (0, −10, −20), yhsv=(60, 100, 100) will be corrected to (60, 90, 80). Converting the correction values (60, 90, 80) into RGB yield (204, 204, 20), and these values are the correction values y_c of the end point y (255, 255, 0).

In this manner, correction values of all end points have been generated by the LUT end point correction value generation unit 110. Then, the LUT reference point selection unit 111 selects one reference point (step S103). Here, the LUT reference point selection unit 111 selects (128, 128, 0) as a reference point.

Next, the brightness normalization unit 112 normalizes the reference point (step S104). Since the maximum value of the elements of the reference point (128, 128, 0) is 128, the brightness normalization unit 112 takes 2 as the normalization coefficient m, and takes (255, 255, 0) as NRGB.

Then, the interpolation unit 113 interpolates the normalized reference point (step S105). The interpolation unit 113 defines an addition coefficient k according to the distance D for each end point. In this example, since NRGB matches with the end point y, the distance to NRGB from the end point y is a minimum while the distance to NRGB from the other end points is a maximum. Therefore, addition coefficients k are respectively bk_k=0, r_k=0, g_k=0, b_k=0, y_k=1, m_k=0, and w_k=0.

Therefore, TC=0×bk_c+0×r_c+0×g_c+0×b_c+1×y_c+0× m_c+0×w_c=y_c. In this example, this y_c is the value described in step S102 in which the end point y (255, 255, 0) has been corrected by the set values (h, s, v). Accordingly, (204, 204, 20) have already been generated as correction values by the LUT end point correction value generation unit 110. These (204, 204, 20) become a reference point that has been normalized by the interpolation unit 113, and it is output from the interpolation unit 113 to the brightness inverse normalization unit 114.

Next, the brightness normalization unit 114 inverse-normalizes the interpolated reference point (step S106). Since the normalization coefficient m is 2, the brightness inverse normalization unit 114 multiplies (204, 204, 20) by ½, and thereby, (102, 102, 10) are found as correction values of the reference point (128, 128, 0).

The brightness inverse normalization unit 114 stores the correction values found in this manner in the LUT data memory unit 13 as corrected reference point correction values (step S107). Next, the LUT reference point selection unit 111 determines whether or not correction values of all reference points have been found (step S108). If correction values of all reference points have not been found (step S108: NO), the process returns to step S103. On the other hand, if correction values of all reference points have been found (step S108: YES), since 3D LUT data (correction values of all reference points) has been generated, the 3D LUT 115 acquires the 3D LUT data from the LUT data memory unit 13 and sets the acquired 3D LUT data in itself. Next, the display control unit 15 acquires the 3D LUT data from the 3D LUT 115 (step S109). The display control unit 15 then converts the video signal output from the video receiving unit 14 using the 3D LUT (3D LUT data) (step S110), and outputs the converted video signal to the display unit 16. The display unit 16 displays a video image indicated by the converted video signal output from the display control unit 15 (step S111), and this process ends.

Figure 5A:
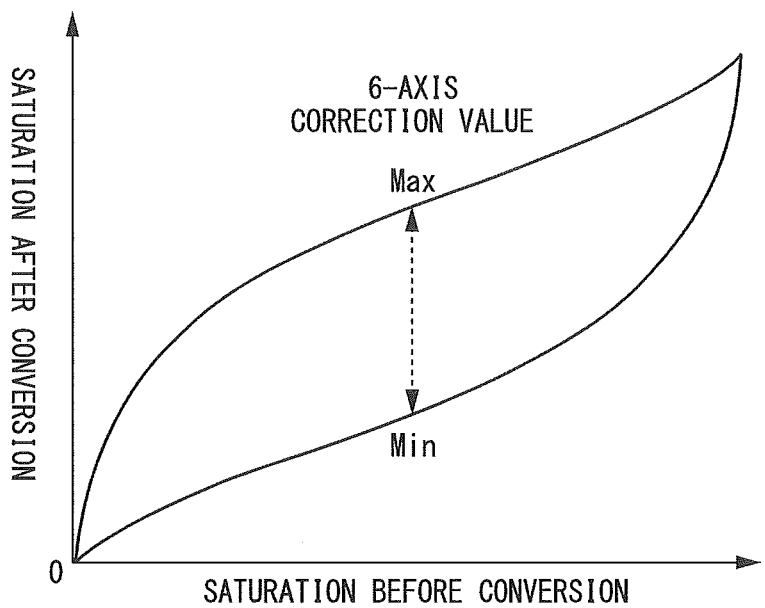
FIG. 5A is a diagram showing a relation between saturation before conversion by 3D LUT, and saturation after conversion by 3D LUT, in a related art of the exemplary embodiment.
Figure 5B:
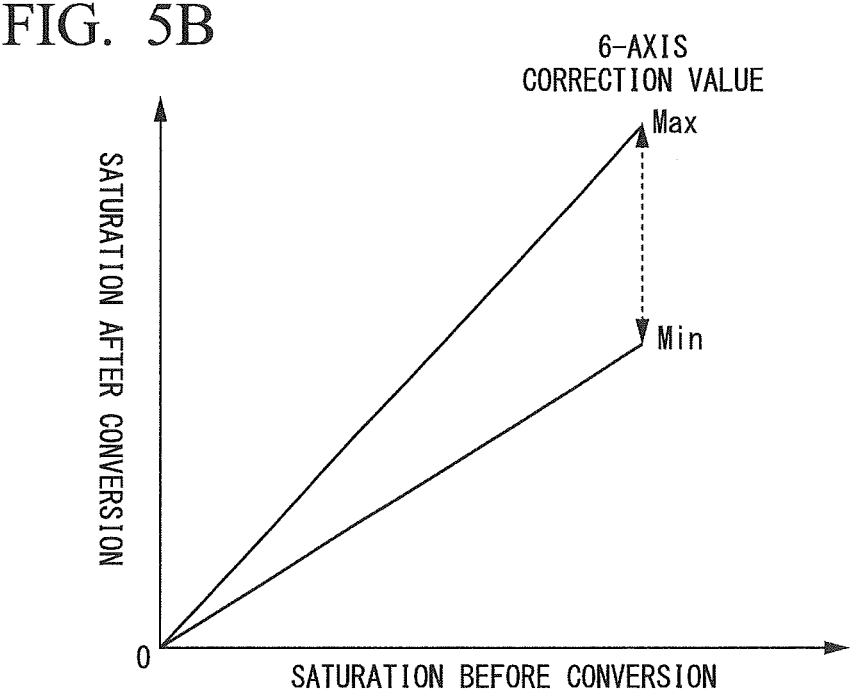
FIG. 5B is a diagram showing a relation between saturation before conversion by 3D LUT, and saturation after conversion by 3D LUT, in the exemplary embodiment.

In the exemplary embodiment described above, correction values of the end points of 3D LUT are generated by the 6-axis correction values set by the user. At this time, the interpolation method that matches the interpolation characteristic between reference points of the 3D LUT circuit is used, to generate intermediate color correction values from primary color correction values. Image quality deterioration can be suppressed by this method. This is described specifically with reference to FIG. 5A and FIG. 5B. FIG. 5A and FIG. 5B are diagrams showing differences in characteristics from a generic 6-axis correction. In both graphs shown in FIG. 5A and FIG. 5B, the horizontal axis represents saturation before conversion by 3D LUT, and the vertical axis represents saturation after conversion by 3D LUT.

In a generic 6-axis correction, as shown in FIG. 5A, intermediate color is directly changed with 6-axis correction values. In this case, depending on intermediate color shift, image quality deterioration such as hue distortion occurs due to 3D LUT interpolation. On the other hand, in the present exemplary embodiment, as shown in FIG. 5B, end point correction values of 3D LUT are generated with 6-axis correction values set by the user, and then primary color correction values of these eight primary colors (R, G, B, C, M, Y, Bk, W) are interpolated, to thereby generate intermediate color correction values. Here, the calculation characteristic at the time of interpolation between primary colors is matched with interpolation characteristic between reference points (=intermediate colors), and as a result, the image quality deterioration mentioned above can be avoided.

In the present exemplary embodiment, linear interpolation used in a generic 3D LUT circuit is taken as an example. However, the generation device 11 in the present exemplary embodiment finds correction values of an intermediate color between end points in an RGB color space by using the same interpolation characteristic as that of the 3D LUT 115. Therefore, the present exemplary embodiment is not limited to linear interpolation.

Moreover, in the present exemplary embodiment, the brightness normalization unit 112 normalizes an intermediate color so that any one of the elements becomes 255, to thereby generate correction values. This is because intermediate colors (dark colors in particular) are likely to be influenced by Bk end point, and image quality deterioration such as color rolling of gray colors and color fading of dark colors occurs. Therefore, by performing the normalization described above, the influence of Bk end point can be suppressed, and as a result, the image quality deterioration mentioned above can be avoided.

Figure 6:
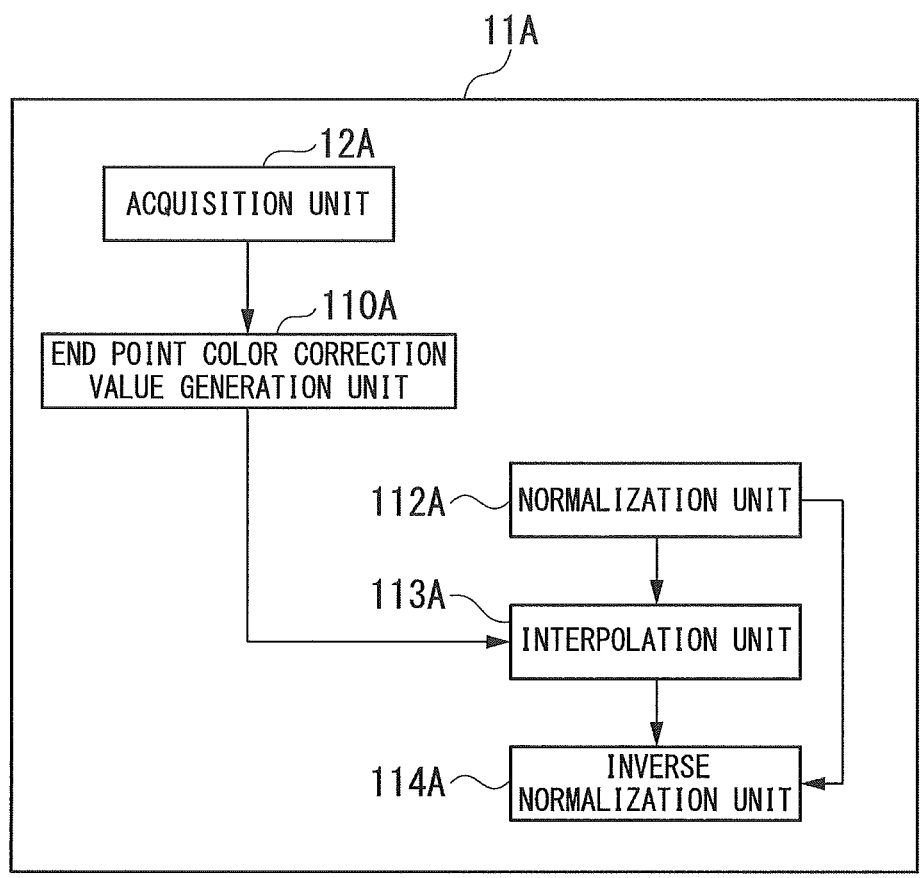
FIG. 6 is a block diagram showing a functional configuration of a generation device according to an exemplary embodiment of the present invention.

FIG. 6 is a block diagram showing a functional configuration of a generation device 11A according to the present exemplary embodiment. As shown in FIG. 6, the generation device 11A is a color conversion data generation device for generating correction values to be set on a three-dimensional lookup table (3D LUT) circuit. The generation device 11A includes an acquisition unit 12 A, an end point color correction value generation unit 110A, a normalization unit 112A, an interpolation unit 113A, and an inverse normalization unit 114 A. The acquisition unit 12A acquires end point correction values for correcting a color of at least one end point of a red, green, blue (RGB) color space. The end point color correction value generation unit 110A corrects the color of the at least one end point using the acquired end point correction values, to generate end point color correction values. The normalization unit 112A normalizes an intermediate color in the RGB color space using a normalization coefficient. The normalization coefficient is defined according to the intermediate color. The interpolation unit 113A interpolates the normalized intermediate color using the generated end point color correction values by means of same interpolation characteristic as that of the 3D LUT circuit, to generate temporary correction values. The inverse normalization unit 114A inverse-normalizes the generated temporary correction values using an inverse normalization coefficient, to generate correction values of the intermediate color. The inverse normalization coefficient is defined according to the normalization coefficient.

With this configuration, it is possible to generate correction values to be set on the 3D LUT circuit that are capable of suppressing image quality deterioration. Moreover, as the acquisition unit 12A, the 6-axis correction value memory unit 12 shown in FIG. 1 may be used.

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

What is claimed is:

1. A color conversion data generation device for generating correction values to be set on a three-dimensional lookup table (3D LUT) circuit having interpolation characteristics, the color conversion data generation device comprising:

an acquisition unit that acquires end point correction values for correcting a color of at least one end point of a red, green, and blue (RGB) color space, the at least one end point being a point where each tone value of red, green, and blue in the RGB color space is a minimum value or a maximum value;

an end point color correction value generation unit that corrects the color of the at least one end point using the acquired end point correction values, to generate end point color correction values;

a normalization unit that normalizes an intermediate color in the RGB color space using a normalization coefficient, the normalization coefficient being defined according to the intermediate color;

an interpolation unit that interpolates the normalized intermediate color using the generated end point color correction values by interpolation characteristic same as the interpolation characteristics of the 3D LUT circuit, to generate temporary correction values; and an inverse normalization unit that inverse-normalizes the generated temporary correction values using an inverse normalization coefficient, to generate correction values of the intermediate color, the inverse normalization coefficient being defined according to the normalization coefficient.

2. The color conversion data generation device according to claim 1, wherein the normalization unit uniformly multiplies each of tone values of red (R), green (G), and blue (B) to normalize the intermediate color, the tone values of R, G, and B showing the intermediate color, and wherein the normalization coefficient is set so that one tone value multiplied by the normalization coefficient becomes a tone maximum value of a red, green, or blue tone in the RGB color space, the one tone value being a highest tone value among the tone values of R, G, and B showing the intermediate color.

3. The color conversion data generation device according to claim 1, wherein the interpolation unit finds an addition coefficient that is defined for each of the at least one end point according to a distance between the normalized intermediate color and each of the at least one end point, the addition coefficient being defined for each of the at least one end point, and wherein the interpolation unit multiplies the end point color correction values by the addition coefficient so as to interpolate the normalized intermediate color, to generate the temporary correction values.

4. The color conversion data generation device according to claim 1, wherein the inverse normalization coefficient is an inverse of the normalization coefficient, and wherein the inverse normalization unit uniformly multiplies the temporary correction values so as to the inverse-normalize the temporary correction values, to generate the correction values of the intermediate color.

5. The color conversion data generation device according to claim 1, further comprising:

a memory unit that stores the end point color correction values and the correction values of the intermediate color.

6. The color conversion data generation device according to claim 1, further comprising:

the 3D LUT circuit, the end point color correction values and the correction values of the intermediate color being set in the 3D LUT circuit.

7. A display device, comprising:

the color conversion data generation device according to claim 1;

a conversion unit that converts a video signal using the 3D LUT circuit in which the end point color correction values and the correction values of the intermediate color are set; and a display unit that displays a video image indicated by the converted video signal.

8. The display device according to claim 7, wherein the conversion unit converts a color of a video signal using the interpolation characteristics of the 3D LUT circuit, the color of the video signal being between a plurality of reference points, the intermediate color including a plurality of intermediate colors, the plurality of reference points including the plurality of intermediate colors.

9. The color conversion data generation device according to claim 1, wherein the interpolation unit finds an addition coefficient that is defined for each of the at least one end point according to a distance between the normalized intermediate color and each of the at least one end point.

10. The color conversion data generation device according to claim 9, wherein the interpolation unit multiplies the end point color correction values by the addition coefficient so as to interpolate the normalized intermediate color.

11. The color conversion data generation device according to claim 9, wherein the interpolation unit multiplies the end point color correction values by the addition coefficient so as to interpolate the normalized intermediate color, to generate the temporary correction values.

12. A color conversion data generation method for generating correction values to be set on a three-dimensional lookup table (3D LUT) circuit g interpolation characteristics, the color conversion data generation method comprising:

acquiring end point correction values for correcting a color of at least one end point of a red, green, blue (RGB) color space, the at least one end point being a point where each tone value of red, green, and blue in the RGB color space is a minimum value or a maximum value;

correcting the color of the at least one end point using the acquired end point correction values, to generate end point color correction values;

normalizing an intermediate color in the RGB color space using a normalization coefficient, the normalization coefficient being defined according to the intermediate color;

interpolating the normalized intermediate color using the generated end point color correction values by interpolation characteristic same as the interpolation characteristics of the 3D LUT circuit, to generate temporary correction values; and inverse-normalizing the generated temporary correction values using an inverse normalization coefficient, to generate correction values of the intermediate color, the inverse normalization coefficient being defined according to the normalization coefficient.

13. The color conversion data generation method according to claim 12, wherein the interpolating includes:

finding an addition coefficient that is defined for each of the at least one end point according to a distance between the normalized intermediate color and each of the at least one end point, the addition coefficient being defined for each of the at least one end point; and multiplying the end point color correction values by the addition coefficient so as to interpolate the normalized intermediate color, to generate the temporary correction values.

14. The color conversion data generation method according to claim 12, wherein the interpolating includes:
  finding an addition coefficient that is defined for each of the at least one end point according to a distance between the normalized intermediate color and each of the at least one end point.

15. The color conversion data generation method according to claim 14, wherein the interpolating further includes:
  multiplying the end point color correction values by the addition coefficient so as to interpolate the normalized intermediate color.

16. The color conversion data generation method according to claim 14, wherein the interpolating further includes:
  multiplying the end point color correction values by the addition coefficient so as to interpolate the normalized intermediate color, to generate the temporary correction values.

* * * * *